Jan. 10, 1933.     H. C. TERRELL     1,893,971
STORAGE BATTERY LIFTER
Filed Dec. 6, 1930    2 Sheets-Sheet 1
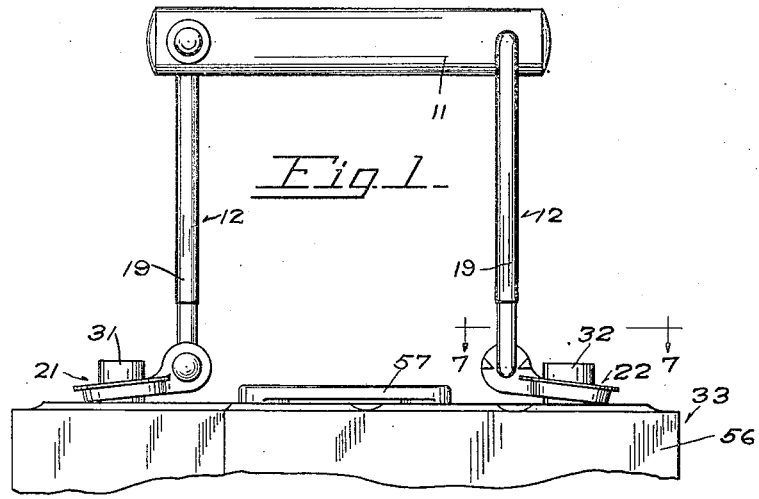
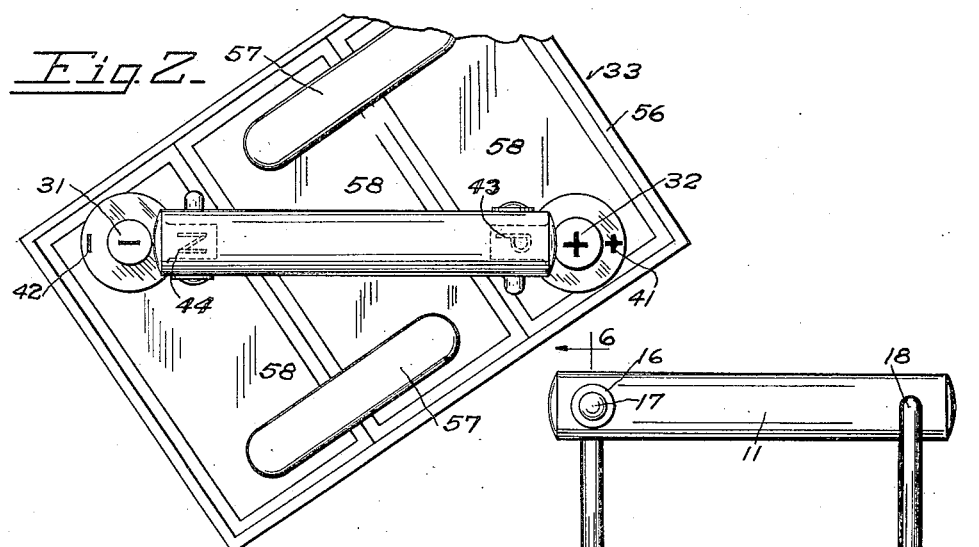
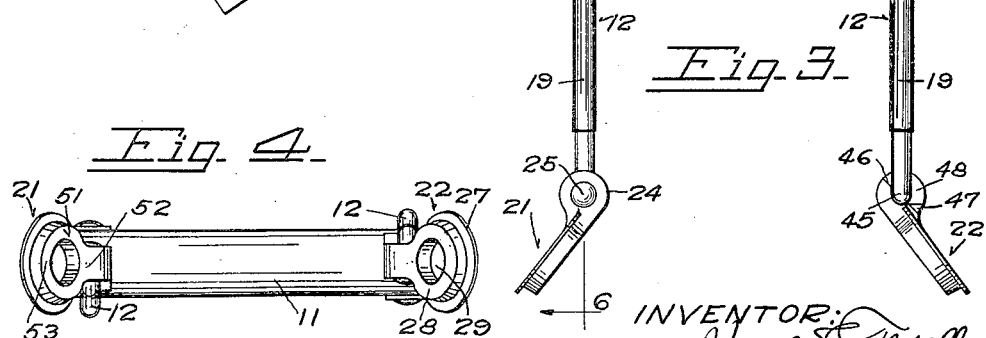
INVENTOR:

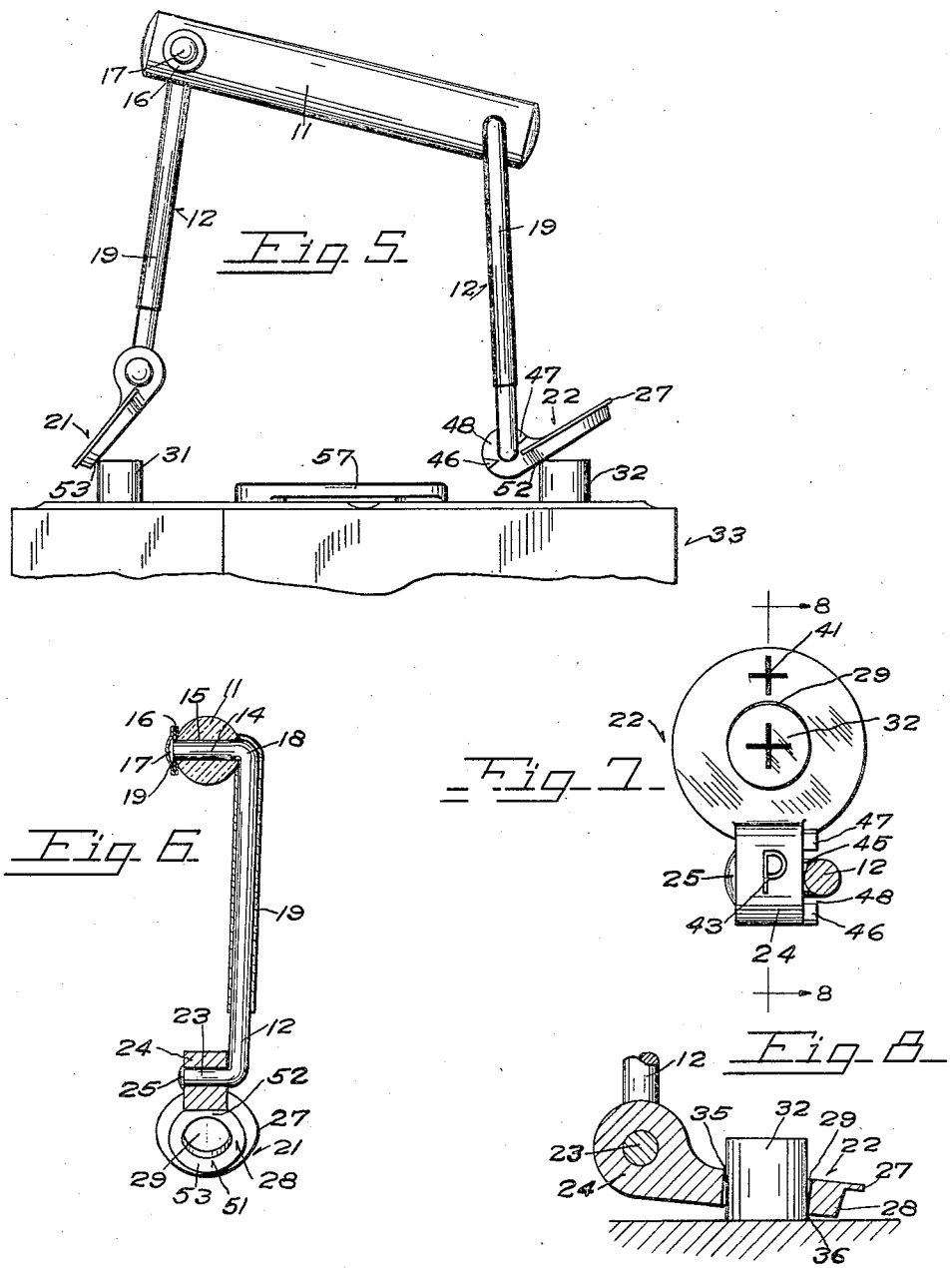

Patented Jan. 10, 1933

1,893,971

UNITED STATES PATENT OFFICE

HAROLD C. TERRELL, OF CINCINNATI, OHIO, ASSIGNOR TO THE OHIO PARTS COMPANY, OF CINCINNATI, OHIO, A CORPORATION OF OHIO

STORAGE BATTERY LIFTER

Application filed December 6, 1930. Serial No. 500,551.

Manufacturers of storage batteries used in automobiles and other self-propelled vehicles and in connection with explosive engines and for other purposes have for sometime past and are now economizing in the cost of manufacture of such batteries, and in pursuing such economies have gradually eliminated the handles, finger ledges and other carrying facilities thereon, and have lately reduced the height and size of the cell connector straps which connect adjacent cells in the battery, and lowered such connector straps on the battery, so as to eliminate the available space heretofore existing between said connector straps and the top of the cells as heretofore used in lifting the battery.

The result of such economies has been to devoid storage batteries of holding or gripping means whereby to lift and carry the batteries.

It is the object of my invention to provide novel means whereby gripping of the battery may be obtained by coaction with the protruding terminal posts of the battery. These terminal posts are the posts which still extend from the battery and to which the positive and negative conductors are in practice clamped. The clamps of these conductors are in practice released from the terminal posts when it is desired to service the battery.

It is the object of my invention to provide a storage battery lifting device having parts thereon arranged to be received about the terminal posts and to automatically grip the terminal posts by the action of lifting applied to the lifting device; further to support such gripping means in a manner to readily locate the same over the terminal posts; further, to so mount such gripping means as to readily selectively space the same apart for connection with terminal posts on various batteries spaced different distances apart; and, further, to provide gripping parts for the terminal posts having apertures in which the posts are received, and contact faces adjacent to said apertures for guiding the walls of such apertures about the terminal posts.

It is the object of my invention, further, to provide gripping parts for the terminal posts pivotally mounted and normally suspended in slanting positions so as to readily engage with the terminal posts; further, to provide means whereby to limit the pivotal movements of the gripping parts so as to constantly dispose the apertures therein downwardly; and, further, to provide guiding faces at the respective sides of the apertures arranged to be slanted upwardly or downwardly to laterally engage the upper ends of the terminal posts for guidance about the terminal posts.

The invention will be further readily understood from the following description and claims, and from the drawings, in which latter:

Fig. 1 is a side elevation of my improved device having gripping engagement with the terminal posts of a storage battery, the latter partly broken away.

Fig. 2 is a plan view of the same.

Fig. 3 is a side elevation of my improved device with the gripping parts suspended in normal positions.

Fig. 4 is a bottom view of the same.

Fig. 5 is a side elevation of the same, shown in association with a storage battery, and showing one of the gripping parts in partially outwardly and downwardly extending relation about to be moved about one of the terminal posts, and showing the other gripping part in outwardly and upwardly inclined relation about to be moved about the other terminal post.

Fig. 6 is a vertical section of my improved device, taken on the line 6—6 of Fig. 3.

Fig. 7 is a cross-section of the same, taken in the plane of the line 7—7 of Fig. 6; and, Fig. 8 is a vertical section of the same, taken on the line 8—8 of Fig. 7, and shown in gripping association with a terminal post, the battery being partly broken away.

A handle 11 is shown as a bar, and has hangers 12, suspended therefrom at its respective ends. These hangers are exemplified in the form of rods having upper laterally bent portions 14 located in holes 15 in the handle, and loosely held in said holes so as to form pivotal connections between the rods and the handle. Washers 16 are received over the protruding ends of the bent portions, the outer ends of the bent portions being upset as shown at 17. The pivoting portion of the rod is held in the handle by the washer at one side of the bar and the bend 18 in the rod at the other side of the bar.

The handle is of electric insulating material, for instance wood, and the hangers and washers preferably have an electric insulating coating 19 thereon. (Fig. 6).

Gripping parts 21, 22, are at the lower ends of the hangers and are exemplified as loosely pivoted to the hangers, as by providing the hanger rods with lower laterally extending bent ends 23 received in bearings 24 on the gripping parts. The protruding ends of the laterally bent portions are upset as shown at 25 for retaining the gripping parts on the hangers.

The gripping parts are shown in the form of disks 27 having reinforced ribs 28 and apertures 29, forming ring structures in which the respective terminal posts 31, 32, of the storage battery 33 are arranged to be received. When the gripping parts are located about the terminal posts, lifting movement upon the handle causes tilting of the gripping parts on the posts, so as to cramp opposite upper and lower ends of opposite walls 35, 36, of the apertures against opposite sides of the posts, for cramping the posts to the gripping parts and forming lifting engagement between the gripping parts and the post and battery. The battery may be thereby lifted and carried.

When the battery has been placed upon the support to which it is carried, downward movement of the handle, or release of the handle so as to permit lowering of the handle by gravity, will relieve the cramping strain of the gripping parts upon the terminal posts, so as to arrange the walls of the holes parallel with the terminal posts for permitting removal of the gripping parts in axial directions from the terminal posts. The provision of the ribs 28 at the apertures 29 elongates the walls of the apertures so as to reduce tilting motion of the disks when raising and carrying the battery.

The apertures in the respective gripping parts are preferably of different diameters. The gripping part with the aperture of larger diameter is arranged to be received about the positive terminal post of the storage battery and the gripping part having the aperture of smaller diameter is arranged to be received about the negative terminal post of said battery. These terminal posts are in practice respectively of such relatively different diameters. The respective gripping parts have corresponding designation thereon, as a plus sign and minus sign, shown respectively at 41 and 42, and the letters "P" and "N" designating positive and negative, as shown at 43 and 44.

The gripping part is normally suspended in downwardly and outwardly inclined position on the hanger, (Fig. 3), the tilting movement of the gripping part in downward direction being limited by stops exemplified as the lower bend 45 of the hanger-rod and a coacting lug 46 on the gripping part. Upward tilting movement of the gripping part is also preferably limited by stops shown as comprising the bend 45 of the hanger-rod and a lug 47 on the gripping part, limiting upward tilting movements of the gripping part in outwardly upwardly inclined direction. Swinging movement of the gripper part is permitted throughout the space 48 between said lugs.

The lower side of the gripping part is provided with a contact face 51 about the aperture arranged to coact with the upper end of the terminal post for aiding in guiding the terminal post into the aperture. The portions 52, 53, of said contact face at the sides of said aperture toward and away from the pivot of the gripping part especially aid in tilting the gripping part by lateral movement imparted by the operator to the hanger-rod for aiding in locating the post in the aperture. (See Fig. 5).

The gripping parts are arranged to swing upon their hanger-rods and the hanger-rods are arranged to swing in the handle for readily shifting the gripping parts with relation to the positions of and the distance between the terminal posts. Both gripping parts may be simultaneously shifted by means of the handle. The gripping parts may also be located about the terminal posts by direct manipulation thereof.

The gripping parts are preferably allowed to descend toward the lower ends of the terminal posts, or are pushed into such positions, with the gripping parts horizontally disposed about the posts. Upon lifting movement being applied to the handle, the pivotal ends of the gripping parts are lifted, thereby tilting the gripping parts and causing a cramping thereof upon the terminal posts. Opposite upper and lower ends of opposite walls of the apertures are by such tilting caused to cramp opposite sides of the terminal post, for forming a lifting connection therewith, and said opposite ends may bite into said walls for forming a firmer connection therewith. The weight of the storage battery determines the amount of frictional engagement between the gripping parts and the terminal posts, such frictional engagement increasing with the load.

Sufficiently firm connection is made between the gripping parts and the posts to permit lifting of the storage battery and the carrying thereof. When the lifting strain is released from the gripping parts, the lifting device may be readily released from the terminal posts by lifting movement upon the gripping parts parallel with the axes of the terminal posts.

In modern storage battery construction the case 56 thereof is usually made without any handles or gripping means, and the connector straps 57, connecting the cells 58 of the battery, are close to the upper ends of said cells, and are of such form as to prevent lifting force or lifting means being applied thereto.

My improved device is especially useful in lifting and carrying storage batteries of modern construction, and employs the protruding terminal posts as connecting means between the lifting device and the battery.

Having thus fully described my invention what I claim as new, and desire to secure by Letters Patent, is:

1. In a storage battery lifter, the combination of a gripping part and an electrically insulated handle therefor, said gripping part having an aperture receiving the terminal post of the storage battery, said gripping part arranged to tilt by gravity upon lifting movement applied to said handle, and opposite ends of opposite walls of said aperture arranged to cramp opposite sides of said terminal post upon such tilting movement applied to said gripping part.

2. In a storage battery lifter, the combination of a handle and a pair of spaced-apart gripping parts having connections at the sides of said gripping parts with said handle and arranged for normal downward tilting of said gripping parts by gravity and for tilting said gripping parts upon lifting said handle, said gripping parts having apertures for the terminal posts of a storage battery, and opposite ends of opposite walls of said apertures arranged to cramp said respective terminal posts by so tilting said gripping parts upon lifting movement of said handle for gripping said posts.

3. In a storage battery lifter, the combination of a handle and a pair of spaced-apart gripping parts having connections at the sides of said gripping parts with said handle and arranged for normal downward tilting of said gripping parts by gravity, said gripping parts having apertures of different diameters for terminal posts of different diameters of the same storage battery, and opposite walls of said apertures arranged to cramp said respective terminal posts of different diameters by such tilting of said gripping parts upon lifting movement of said handle for gripping said posts.

4. In a storage battery lifter, the combination of a gripping part having an aperture arranged to be received about the terminal post of the storage battery and bottom contact faces at the sides of said aperture for contacting the top of the terminal post of the battery, a handle, pivotal connecting means between said gripping part and said handle normally suspending said gripping part with the axis of said aperture at an angle to the axis of said terminal post and permitting contact of said contact faces with the top of said terminal post for arrangement of said gripping part about said terminal post with said axes substantially coincident, and arranged for tilting said gripping part by lifting movement on said handle whereby to cramp opposite sides of said terminal post by opposite ends of opposite walls of said aperture and means at said pivotal connecting means limiting downward tilting movement of said gripping part for normally presenting said downwardly presented contact faces downwardly in operative relation with the top of said terminal post.

5. In a storage battery lifter, the combination of a handle, hangers swingingly pivoted to the respective ends of said handle, gripping parts swingingly pivoted to the lower ends of said hangers and provided with apertures in which the respective terminal posts of the storage battery are received, and electric insulating means for said handle and said hangers.

6. In a storage battery lifter, the combination of a handle, hangers pivoted at the respective ends of said handle, laterally spaced-apart gripping parts, said gripping parts respectively having apertures arranged to receive the terminal posts of a storage battery and bottom contact faces at the sides of said aperture arranged to contact the tops of said terminal posts for guiding the walls of said apertures about said terminal posts, and pivots between the lower ends of said hangers and said gripping parts at the sides of said apertures normally locating said gripping parts in downwardly slanting directions, and arranged for tilting said gripping parts by lifting movement of said handle for cramping opposite ends of opposite walls of said apertures upon opposite sides of said terminal posts.

7. In a storage battery lifter, the combination of a handle, hangers pivoted at the respective ends of said handle, spaced-apart gripping parts, said gripping parts having apertures arranged to receive the spaced-apart terminal posts of a storage battery, and pivots between the lower ends of said hangers and said gripping parts at the sides of said apertures normally causing downward slanting of said gripping parts by gravity, and arranged for tilting said gripping parts by lifting movement of said handle for cramping opposite ends of opposite walls of said respective apertures upon opposite sides of said respective terminal posts, said hangers and said gripping parts provided with complemental limiting parts limiting downward tilting movement of said gripping parts.

8. In a storage battery lifter, the combination of a handle and a pair of laterally spaced apart gripping parts respectively having connections at the sides of said gripping parts with said handle for tilting said gripping parts upon lifting said handle, said respective gripping parts having apertures for the respective terminal posts of a storage battery, and opposite walls of said respective apertures arranged to cramp opposite sides of the respective terminal posts by so tilting said gripping parts for gripping said posts upon lifting movement applied to said handle.

9. In a storage battery lifter, the combination of a handle and a pair of laterally spaced-apart gripping parts arranged for adjusting the distance between said gripping parts, said pair of laterally spaced-apart gripping parts respectively having connections at the sides of said gripping parts with said handle arranged to permit tilting of said respective gripping parts upon lifting said handle, said respective gripping parts having apertures for the respective terminal posts of a storage battery, and opposite walls of said respective apertures arranged to cramp opposite sides of said respective terminal posts by so tilting said gripping parts for gripping said posts upon lifting movement applied to said handle.

10. In a storage battery lifter, the combination of a handle and a pair of laterally spaced-apart gripping parts having overbalancing connections with said handle for normal tilting of said gripping parts by gravity, said respective gripping parts having apertures for the respective terminal posts of a storage battery, and opposite walls of said respective apertures arranged to cramp opposite sides of said respective terminal posts by such tilting of said gripping parts for gripping said terminal posts upon lifting movement applied to said handle.

11. In a storage battery lifter, the combination of a handle and a pair of laterally spaced-apart gripping parts having overbalancing connections with said handle and arranged to permit tilting of said respective gripping parts upon lifting said handle, said respective gripping parts having apertures of different diameters respectively for the positive terminal post and the negative terminal post of different diameters of the same storage battery, opposite walls of said apertures arranged to cramp said respective terminal posts of different diameters by such tilting of said gripping parts upon lifting movement of said handle, and said respective gripping parts provided with designations respectively denoting the positive terminal post and the negative terminal post of the storage battery with which they are to respectively coact.

In testimony whereof, I have hereunto signed my name.

HAROLD C. TERRELL.